Oct. 20, 1936.  G. L. McCAIN  2,058,245
MOTOR VEHICLE POWER TRANSMISSION
Filed April 18, 1934    2 Sheets-Sheet 1
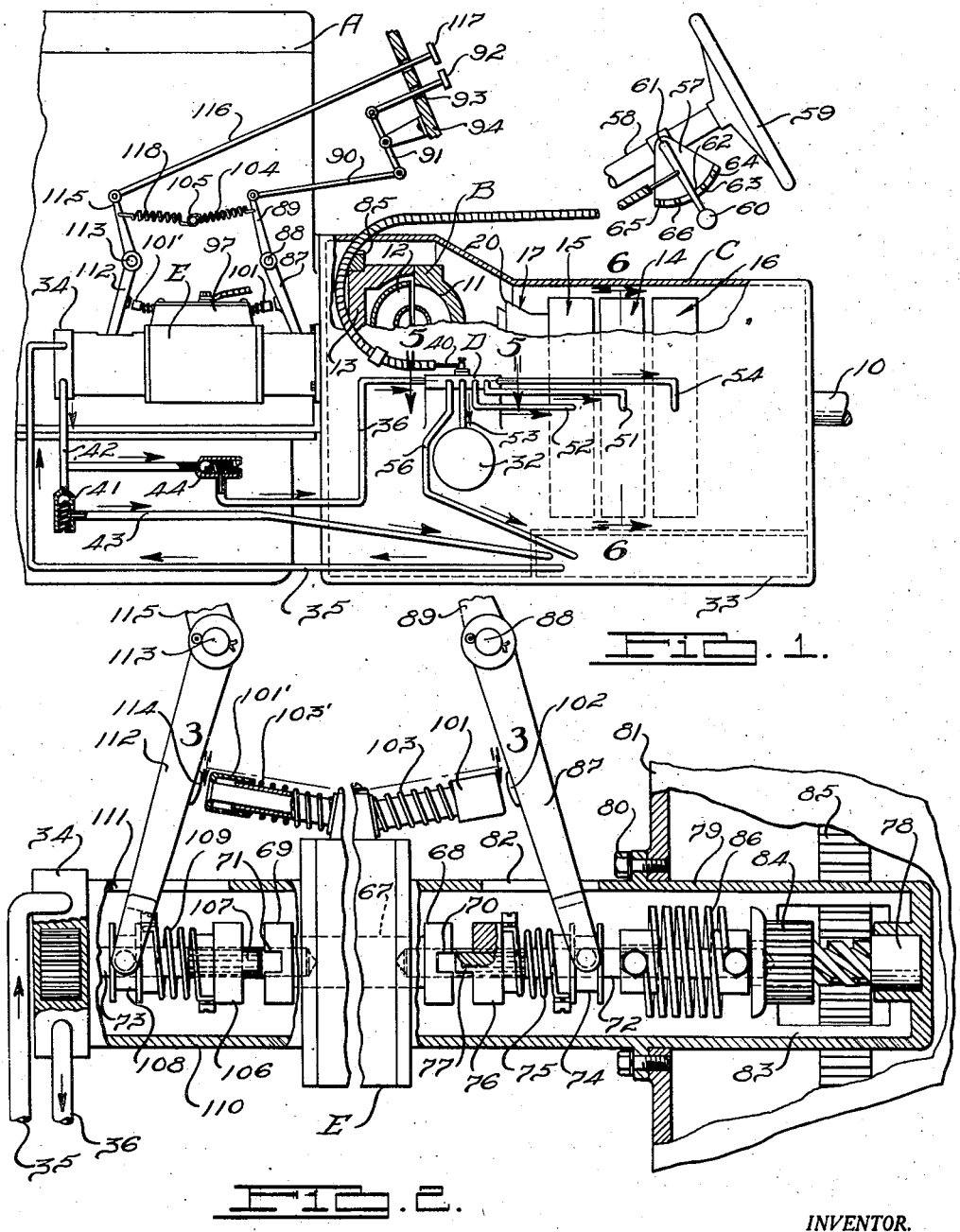
INVENTOR.
George L. McCain.
BY
ATTORNEYS.

Oct. 20, 1936.   G. L. McCAIN   2,058,245
MOTOR VEHICLE POWER TRANSMISSION
Filed April 18, 1934   2 Sheets-Sheet 2
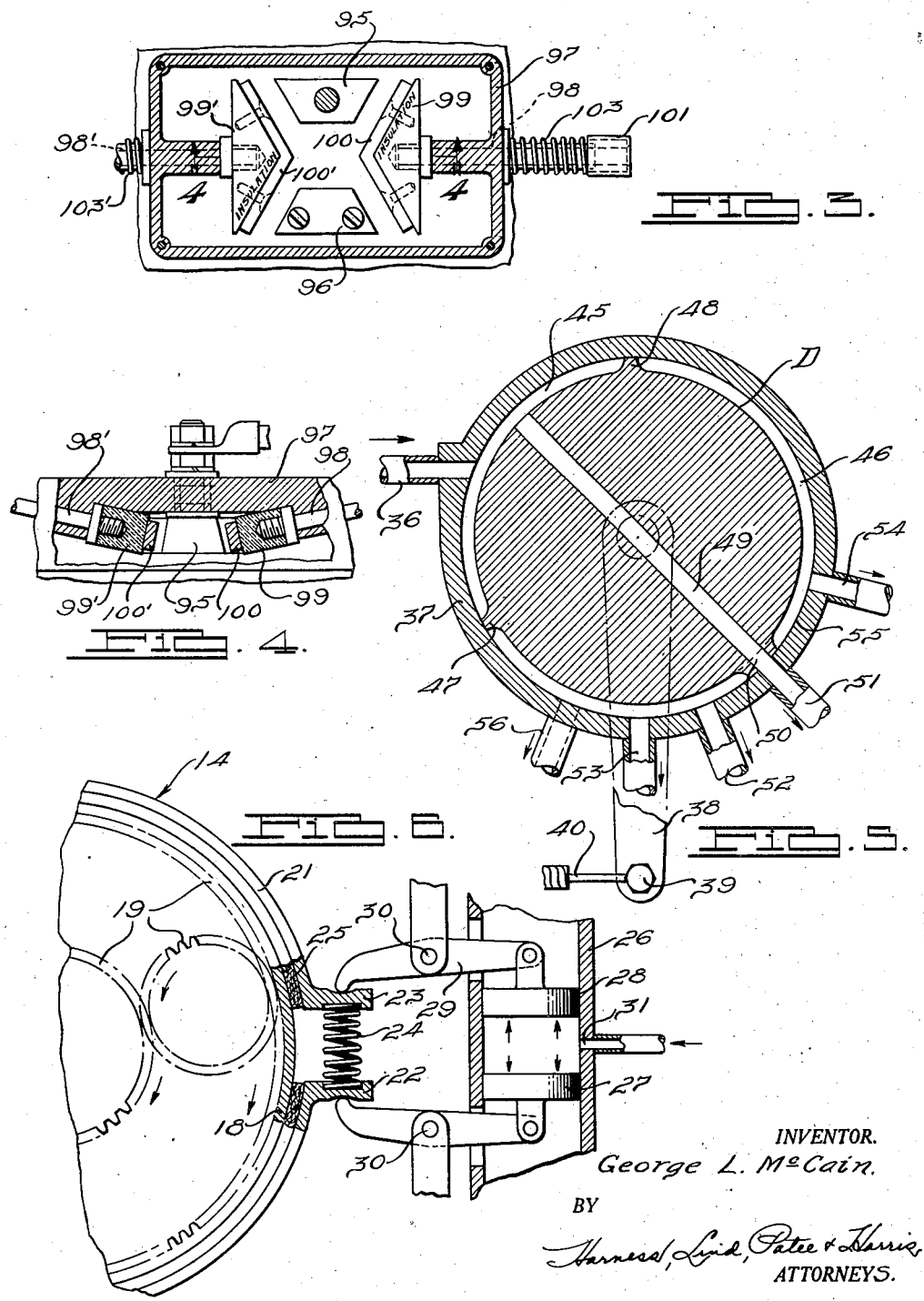
INVENTOR.
George L. McCain.
BY
ATTORNEYS.

Patented Oct. 20, 1936

2,058,245

UNITED STATES PATENT OFFICE 2,058,245

MOTOR VEHICLE POWER TRANSMISSION

George L. McCain, Detroit, Mich., assignor to Chrysler Corporation, Detroit, Mich., a corporation of Delaware Application April 18, 1934, Serial No. 721,109

18 Claims. (Cl. 74—262)

This invention relates to motor vehicles and refers more particularly to improvements in means for transmitting power to drive such vehicles.

More particularly, I have provided improvements especially adapted for varying the driving speed ratios of motor vehicles.

It is an object of my invention to provide improvements in motor vehicle transmissions and controls therefor; to provide improved means for operating the various gear trains of a transmission; and to provide relatively simple means for controlling and actuating the various gear ratios of a transmission, capable of manufacture at relatively low cost. While my invention, in the broader aspects thereof, is applicable to various types of transmissions including well-known types of countershaft gear selector transmissions, my invention is particularly related to motor vehicles having speed ratio changing transmissions of the planetary or epicyclic gear type.

A further object of my invention is to provide improved transmission controlling means, especially adapted for use with planetary transmissions, my transmission control operating to establish the various gear ratios with improved positiveness, simplicity, and efficiency.

A further object of my invention, in its more limited aspects, resides in the provision of fluid operating means of improved form and arrangement for controlling the planetary gear sets of a transmission, or other corresponding parts of other types of transmissions. In connection with this phase of my invention, the fluid pressure is preferably provided by a suitable liquid medium such as oil, but the fluid pressure medium may be air under pressure greater or less than atmospheric pressure.

A further object of my invention resides in the provision of improved means for controlling and changing the speed ratios of a transmission, preferably of the planetary gear type, wherein changes in the speed ratios are produced in an improved manner.

In carrying out the objects of my invention, I have provided a transmission speed ratio controlling means of the character referred to wherein the various transmission gear ratios may be manually selected under control of the vehicle driver, the transmission being manipulated under power through the operation of a prime mover. In the preferred embodiment of my invention, this prime mover is an electric motor and preferably the same electric motor which is ordinarily employed in connection with the usual engine starting system.

The electric starting motor usually employed to start operation of the motor vehicle driving engine is operated only when the engine is started and while the motor vehicle is being driven this starter motor remains idle. It is thus a further object of my invention to utilize the normally inactive starter motor for a useful purpose in connection with a motor vehicle power transmission system and more particularly for supplying the power necessary to effect driving speed ratios of the motor vehicle transmission.

A planetary type of transmission presents a number of advantages over the more conventional sliding gear types of transmissions, and my invention is therefore primarily directed toward planetary types of transmissions and power transmission systems employing planetary gearing speed ratio controlling devices, although as aforesaid, the fundamental principles of my invention may, if desired, be employed in connection with transmissions of other types including the aforesaid sliding gear types of transmissions. By way of example in connection with the aforesaid advantages of the planetary transmission over more conventional types, it may be noted that the planetary transmission permits gear changes without the necessity of releasing the main clutch between the engine and transmission so as to obtain relatively quick gear changes and faster acceleration of the motor vehicle. This is made possible by reason of the fact that the braking devices associated with the respective planetary gear trains are, in effect, clutches in that each rotary drum controlling a planetary gear train is frictionally engaged by its associated braking means.

Further objects and advantages of my invention will be apparent from the following detailed description of one illustrative embodiment of the principles of my invention, reference being had to the accompanying drawings in which;

Fig. 1 is a side elevational view somewhat diagrammatically illustrating my power transmission mechanism as a whole, parts of the transmission and clutch casings being broken away to illustrate the speed ratio controlling brake devices and the main clutch.

Fig. 2 is a sectional elevational view through the engine starting motor and parts associated therewith.

Fig. 3 is a detailed sectional plan view of the starter switch mechanism, the section being taken along the line 3—3 of Fig. 2.

Fig. 4 is a detailed sectional elevational view of the switch mechanism illustrated in Fig. 3, the section being taken along the line 4—4 of Fig. 3.

Fig. 5 is a sectional plan view through the selective speed ratio controlling means or distributor valve, the section being taken along the line 5—5 of Fig. 1.

Fig. 6 is a sectional elevational view somewhat diagrammatic and illustrating a portion of one of the planetary transmission speed ratio brake controlling devices, the section being taken along the line 6—6 of Fig. 1.

Referring to the drawings, I have illustrated my invention in connection with a motor vehicle drive, this drive including a prime mover or engine A, a portion of which is shown in Fig. 1, a clutch B driven from the engine, and a change speed transmission or gear box C driven from the clutch B. The drive passes from the transmission through a power take-off shaft 10 which, as usual, may extend rearwardly of the vehicle to drive the usual ground wheels (not shown).

The clutch B may be of any suitable construction for controlling the drive between engine A and transmission C, this clutch being illustrated in Fig. 1 in the form of a fluid type having the usual driving and driven cooperating vane members 11 and 12 respectively. The driving vane member 11 is carried by the engine flywheel 13 and the driven vane member 12 is secured to the usual power shaft which extends rearwardly to transmission C, this power shaft not being illustrated. I have illustrated a fluid type of clutch since a clutch of this character has a number of advantages in connection with the transmission of the planetary gear type C. Thus, the fluid type of clutch is desirable in providing a smooth drive for the vehicle through the planetary transmission, relatively high power driving efficiency, and other well-known favorable characteristics.

I have illustrated the change speed transmission C as the epicyclic or planetary type, this general form of transmission being known in the art and, as usual, includes a plurality of transmission speed ratio controlling clutches or brakes 14, 15 and 16, these braking devices being respectively adapted to actuate the transmission in its first speed ratio or low gear, second speed ratio, and reverse drive. A further controlling brake device 17 is illustrated as a cone type, this brake being adapted to control the transmission for effecting the third speed herein illustrated as the usual direct drive through the transmission.

The brake controlling devices 14, 15 and 16 are adapted to act on transmission elements associated therewith and usually embodied in the form of a rotary drum, one of which is illustrated at 18 in Fig. 6 in association with the transmission controlling brake 14 for the first speed. The form and arrangement of the planetary gear trains are well known in the art and the details thereof are omitted from my disclosure. The brake controlling device 17 is adapted, according to customary practice, to engage the drum 20 illustrated in Fig. 1 for effecting the direct drive in a well-known manner.

The brake controlling devices 14, 15 and 16 are, for the most part, similar in construction and operation and the following description of the details of the brake device 14 illustrated in Fig. 6 is typical of the other brakes. In Fig. 6 the drum 18 is normally rotated by the planetary gearing 19 associated therewith when the transmission is not in its first speed driving condition, and when rotation of drum 18 is prevented by the braking mechanism associated therewith, then the drive through the transmission takes place for the first speed gear ratio according to well-known practice for planetary gearings of the general type illustrated.

In order to brake the drum 18 I have provided a band 21 around the drum to provide ends 22 and 23 normally separated by a spring 24, the band 21 being provided with a brake lining 25 adapted to contact with the drum when the ends 22 and 23 of the brake band are forced toward each other to contract the band. The band is anchored in any suitable manner not illustrated and suitable brake actuating mechanism is provided for each of the bands such as the fluid pressure actuating mechanism illustrated in Fig. 6, for example.

Associated with each of the brake controlling devices 14, 15 and 16 is a cylinder, one of these cylinders being illustrated at 26 in Fig. 6 in connection with the brake device 14. This cylinder receives a pair of opposed pistons 27 and 28, the pistons being operably connected to actuate the respective band ends 22 and 23 by suitable links 29 pivotally supported at 30. The cylinder 26 has a fluid pressure inlet 31 adapted to admit fluid such as oil under pressure to the space between pistons 27 and 28 so as to actuate these pistons away from each other in contracting the brake band to arrest rotation of the associated controlling drum 18 as shown in Fig. 6. When the fluid pressure is released, the spring 24 will act to space the brake band 21 from drum 18, pistons 27 and 28 being also restored and the fluid pressure being displaced from the cylinder 26 by way of the opening 31.

The direct speed brake controlling device 17 is also suitably actuated by fluid pressure introduced to a cylinder illustrated at 32 in Fig. 1, it being understood that this cylinder is adapted to receive one or more pistons actuated by fluid pressure introduced to the cylinder to cause engagement of the cone type drum 20 to effect the third speed or direct drive through the transmission C.

In order to selectively control the supply of fluid under pressure to the actuating mechanism for each of the various speed ratio controlling brakes, I have provided a fluid pressure control and distributing system illustrated in somewhat diagrammatic form in Figs. 1 and 5. The transmission reservoir 33 contains a quantity of fluid such as oil, a pump 34 being driven in a manner hereinafter referred to so as to draw the oil from the reservoir by a pipe or conduit 35, the oil under pressure being discharged from the pump through a high pressure conduit 36 leading to the valve casing 37 of the selective controlling means herein illustrated in the form of a rotary distributing valve D best shown in Fig. 5. The valve D is adapted for oscillatory adjustment and control by a lever 38 connected at 39 with suitable linkage such as the Bowden wire mechanism 40 which, as will be presently apparent, extends to the manually controlled selector mechanism. A relief valve 41 may be interposed by pipes 42 and 43 between the pressure conduit 36 and reservoir 33 so as to by-pass any excess delivery of pump 34 back to the reservoir. I have also provided a check valve 44 in conduit 36, the check valve permitting the pump 34 to deliver the fluid under pressure through conduit 36 to the distributor valve D but acting to prevent release of the fluid pressure in the portion of conduit 36 which is between check valve 44 and distributor valve D when the pump 34 is not operating.

The valve D cooperates with casing 37 to provide a fluid pressure supply space or chamber 45 and a low pressure space or chamber 46, these chambers being separated from each other by the radially extending valve portions 47 and 48 engaging casing 37. The supply chamber 45 delivers oil under pressure from supply conduit 36 through a passage 49 extending through the valve to a distributing outlet 50 illustrated in Fig. 5 as registering with a conduit 51, the outlet 50 being also adapted for selective alignment with further conduits 52, 53 and 54. The casing 37 has an uninterrupted portion 55 intermediate the conduits 51 and 54 so that when the outlet 50 is adjusted opposite the portion 55, the oil in passage 49 will not escape, this position being the neutral setting of valve D.

The low pressure chamber 46 is continuously open to a conduit 56 which is arranged below the plane of oscillatory movement of outlet 50, the conduit 56 communicating with the reservoir 33 as illustrated in Fig. 1. During movement of valve D, the high pressure chamber 45 is continuously in communication with the oil pressure delivery conduit 36, and the low pressure chamber 46 is continuously in communication with the return conduit 56.

The distributor valve D is adapted to be manually adjusted by the vehicle driver and in Fig. 1 I have illustrated the adjusting or selecting means as comprising a stationary selector segment 57 conveniently mounted to the steering post 58 of the vehicle steering wheel 59, the segment 57 having a plurality of notches, releasable stops or other suitable means for advising the operator of the setting of a hand operated selector lever or element 60 pivotally mounted at 61 in association with the segment 57. The selector lever 60 has a certain amount of resilience so that when moved by the vehicle driver the lever may be sprung for selective engagement with the various notches of segment 57. Thus, the segment 57 has notches or stops 62, 63, 64, 65 and 66 respectively adapted, when engaged with selector arm 60, to manipulate transmission C into the transmission setting for first speed gear ratio drive, the second speed, the third or direct speed, reverse drive, and neutral, the latter setting establishing a neutral condition in the transmission whereby there will be no drive therethrough to the take-off shaft 10. The valve D is thus adapted for positive actuation by selector arm 60 in each of its directions of oscillatory movement by reason of the aforesaid lever 38 and Bowden wire 40, the latter being connected to the selector arm 60 as illustrated in Fig. 1.

In Fig. 1 it will be noted that the selector arm 60 is illustrated as being aligned with the first speed notch 62, and in Fig. 5 the valve D is shown for its position corresponding to this setting wherein the outlet 50 is in communication with the first speed supplying conduit 51. Likewise when the selector arm 60 is adjusted to engage the second speed notch 63, the valve D is moved from the position illustrated in Fig. 5 to a position establishing communication between outlet 50 and the second speed conduit 52. In similar fashion the conduit 53 is the third speed or direct conduit, conduit 54 being the reverse conduit, these conduits being respectively supplied with oil under pressure by communication with the outlet 50 when the selector arm 60 is adjusted to the notches 64 and 65 provided, however, that the fluid pressure supply pump is actuated following a gear ratio change as will be presently apparent. Under similar conditions the outlet 50 may be adjusted to the neutral space 55 when the selector arm 60 is moved to the neutral notch 66.

Referring now to Figs. 1 to 4 inclusive, I will next describe the prime mover or electric motor for starting engine A and also for operating the pump 34. This electric motor E has a driven shaft 67 projecting from opposite ends of the motor where the shaft is formed with clutch members 68 and 69 best shown in Fig. 2. The clutch member 68 has clutch notches or openings 70 and the clutch member 69 has similar openings 71. It will be understood that in Fig. 2 the central portions of the motor E have been broken away. Freely centered in the opposite ends of motor drive shaft 67 are the co-axial shafts 72 and 73 adapted to be selectively driven from shaft 67.

Slidably mounted on shaft 72 is a shifting collar 74 connected by a coil spring 75 to a clutch member 76 splined to shaft 72. The clutch member 76 is provided with clutch jaws or projections 77 adapted to engage openings 70 so as to drivingly connect shafts 67 and 72. The shaft 72 has its outer end 78 journaled in a housing 79 secured at 80 to the flywheel housing 81, the housing 79 being provided with openings 82 and 83. The shaft 72 carries any suitable type of engine starting mechanism whereby on rotation of shaft 72 a starter pinion 84 is engaged with teeth 85 carried by the flywheel 13. The illustrated starter mechanism does not in itself constitute any part of this invention and I have illustrated a well-known type of mechanism including coil spring 86 for actuating the starter pinion 84 in the customary well-known manner.

Extending through opening 82 is a shift lever 87 having a yoked end engageable with collar 74, the lever 87 being pivotally supported at 88 and being provided with an upwardly extending arm 89 connected through link 90 and lever 91 to a starter button or pedal 92. The starter button 92 extends through an opening 93 in the usual toeboard or foot rest 94 of the motor vehicle. As thus far described, it will be apparent that when the vehicle operator presses the button 92, the lever 87 will be actuated to engage the companion clutch members 76 and 68 so as to drivingly connect motor shaft 67 with the starter shaft 72. Simultaneously with the connection of these shafts the electric motor E is adapted to be energized, the arrangement being such that preferably the clutch members 68 and 76 are engaged just prior to energization of the electric motor. To this end the electric motor E is provided with electric contact pieces 95 and 96 respectively connected to the usual storage battery and coils of the electric motor so that when these contact pieces are bridged or connected electrically, a circuit will be established through the electric motor so as to cause the motor to drive shaft 67. The motor E has an upwardly extending housing portion 97 adapted to contain the switch mechanism illustrated in Fig. 3, the housing 97 slidably supporting a shaft 98. The portion of this shaft which extends within casing 97 is provided with an insulated head 99 which carries a conductor 100 adapted to electrically connect the contacts 95 and 96. The outer end of shaft 98 is formed with a cup 101 normally spaced from a projection 102 formed on lever 87. A spring 103 yieldingly urges the cup 101 and shaft 98 outwardly to the positions illustrated in Figs. 2 and 3.

In the operation of the starter mechanism as thus far described, when the vehicle operator depresses button 92 the clutch members 76 and 68 are first engaged as hereinbefore set forth, and immediately thereafter the lever projection 102 engages the cup 101 so that the latter portion of the movement of lever 87 in compressing spring 75 also compresses spring 103 in moving shaft 98 inwardly of the casing 97 so as to establish electrical contact between contact pieces 95 and 96. In this manner the electric motor E is energized and shaft 67 will drive shaft 72 so as to cause the driving pinion 84 to engage the flywheel gear 85 for starting the motor A. When the motor A is started the starter gear 84 is moved away from the flywheel in the customary manner and the operator then removes his foot from the starter button 92 so as to restore the switch contact piece 100 and clutch members 76 and 68 to their respective inoperative positions illustrated in Figs. 1 to 3. In order to facilitate the return of the mechanism to the initial positions, I have provided a spring 104 illustrated in Fig. 1 as being fixed at one end thereof to anchor 105 carried by motor A, the other end of the spring acting on the arm 89.

The starter motor E is also adapted to act as the power means for operating the various transmission speed ratio controlling devices in accordance with the setting of the distributor valve D by manipulation of the selector arm 60. While the energization of motor E may be arranged to take place on operation of the selector arm 60, I prefer to provide a separate manually operated means for energizing the motor independently of the selector arm 60. Thus, referring particularly to Fig. 2, I have provided a clutching member 106 splined to shaft 73 and provided with clutch teeth 107 adapted to engage openings 71 of clutch member 69, the clutch member 106 being moved along shaft 73 by a shifting collar 108 through the intermediary of a coil spring 109, the latter spring having its opposite ends respectively connected to the clutch member 106 and the collar 108. This clutching mechanism is contained in a casing or housing 110 provided with an opening 111 adapted to receive the downwardly extending yoked end of a lever 112 pivotally supported at 113, the lever having a projection 114 similar in construction and function with the projection 102 of lever 87.

Driven at the outer end of shaft 73 is the aforesaid pump 34 and in Fig. 2 a portion of the pump housing is broken away so as to illustrate this pump as a gear type of pump although it will be readily understood that any form of fluid pump may be readily used. The lever 112 has an upwardly extending arm 115 connected through a link 116 to a control pedal 117 which, like the starter button 92, is associated with the toeboard 74 and extends therethrough to manipulate the lever 112. A spring 118 anchored to the aforesaid anchor 105 is connected to the arm 115 and serves to normally maintain the pump control parts in the positions thereof illustrated in Figs. 1, 2 and 3.

On operation of the pedal 117 the lever 112 is adapted to initially engage clutch members 69 and 106 and immediately thereafter the motor E is adapted to be energized during the latter part of the movement of lever 112 by electrically connecting the aforesaid contact pieces 95 and 96 through the intermediary of a bridging conductor 100' corresponding in construction and operation to the aforesaid conductor 100. In similar manner also the contact 100' is carried by an insulated head 99' operated by a shaft 98' yieldingly urged outwardly by a spring 103' to position the shaft carrying cup 101' spaced from the lever projection 114.

It will thus be apparent that when the vehicle operator depresses the control pedal 117, the shafts 67 and 73 are first engaged by movement of clutch element 106 into clutching engagement with the driving clutch element 69, the latter part of the pedal movement actuating lever 112 so as to engage cup 101' to move the conductor 100' to electrically connect the contact pieces 95 and 96 and to thereby establish an electric circuit through the motor E. This causes the motor E to drive the shaft 73 and thereby operate pump 34 to draw fluid from reservoir 33 and deliver the fluid under pressure past the check valve 44 to the delivery conduit 36. It will be understood that the fluid pressure will very quickly build up so that only a momentary actuation of the control pedal 117 is necessary in order to actuate one of the transmission controlling devices. When such transmission controlling device has been operated, the vehicle driver removes his foot from the control pedal 117 and check valve 44 serves to maintain the fluid pressure in the conduit 36 and also throughout the fluid pressure system which at such time is in communication with the distributor outlet 50 of valve D.

In the event that the clutching teeth and openings of the respective clutching members 76 and 68 or 106 and 69 are not aligned so as to initially engage, it will be apparent that the springs 75 or 109 will be compressed to permit movement of the respective collars 74 and 108. In either instance the clutch members will immediately engage when the motor E is energized inasmuch as either the clutch member 68 or the clutch member 69 will be driven with shaft 67 so as to align the respectively associated openings 70 and 71 with the clutch teeth 77 or 107 thereby causing clutching action to take place.

In the operation of my power transmission mechanism, let it be presumed that the parts are positioned for operating the transmission in the first speed as illustrated in Figs. 1, 5 and 6. With the parts in this position the distributor valve D has its fluid distributing outlet 50 aligned with the first speed conduit 51 so as to supply fluid under pressure to the first speed brake controlling device 14 illustrated in Fig. 6 in its operative position for first speed drive through the transmission whereby the drum or rotary element 18 is held against rotation so as to drive shaft 10 through the planetary gearing 19. It will be understood that when the fluid is released in the first speed conduit 51, the pistons 27 and 28 are urged toward each other by spring 24 so as to expand the brake band 21 and release the drum 18.

If the first speed drive was reached from a neutral condition of transmission C, this low gear drive is obtained by manual movement of selector arm 60 from the neutral notch 66 of selector segment 57 to engagement with the first speed notch 62. During such movement the distributor valve D will be rotated clockwise as viewed in Fig. 5 so as to move the fluid outlet 50 from the neutral space 55 into alignment with the first speed conduit 51. After the operator has so adjusted the selector arm 60, he then depresses the control pedal 117 so as to operably connect the electric motor E with pump 34 and also to energize the motor so that the pump 34 is driven to supply the fluid under pressure to the first speed conduit 51.

The operator then releases the pedal 117 and check valve 44 will maintain the fluid under pressure at the first speed brake controlling device 14 so as to maintain the drive in low speed until the selector arm 60 is further manipulated.

When the operator desires to establish the vehicle drive in a further gear ratio such as a higher gear ratio, he moves the selector arm 60 into engagement with the second speed notch 63, for example, such movement further rotating the distributor valve D to align the fluid outlet 50 with the second speed conduit 52. As soon as such movement takes place, the first speed conduit 51 is opened to the low pressure chamber 46 and the first speed brake controlling device 14 is released, the fluid displaced by pistons 27 and 28 moving toward each other passing through the first speed conduit 51 to the low pressure chamber 46 and thence by way of return conduit 56 to the reservoir 33. When the outlet 50 is aligned with the second speed conduit 52, the operator depresses the control pedal 117 to energize the motor E and also to connect the drive to the pump 34 and the second speed brake controlling device 15 is operated to establish the drive in the second gear ratio in a manner which will be readily apparent. In similar manner the selector arm 60 may be adjusted to the third or direct speed notch 64, releasing the second speed control device 15 and, on operation of control pedal 117, causing operation under power of the third speed control device 17 thus establishing a direct drive in high gear ratio for the motor vehicle.

It will be readily understood that the vehicle driver may manipulate the selector arm 60 in any desired position, it not being necessary that the notches of selector segment 57 be engaged in progressive order. Thus, the selector arm 60 may be caused to move from the neutral notch 66 directly to the high speed notch 64 and the motor vehicle may be initially accelerated in high gear if desired. Likewise when the motor vehicle is traveling in any of its forward driving speed ratio, the vehicle driver may operate the selector arm 60 into one of the lower speed ratio settings and, on manipulation of the control pedal 117, the transmission will respond by changing the gear ratio automatically and under power of the electric motor E.

It will furthermore be apparent that the selector arm 60 may be left in one of the forward driving gear ratio settings and the motor vehicle may be brought to rest by the application of the usual wheel brakes (not shown), the fluid clutch B serving to provide the necessary slippage between the engine A and the driven shaft 10 without stalling the engine. When the motor vehicle is again accelerated, it is only necessary for the engine throttle to be opened and the fluid clutch B will take up the drive as will be readily understood. Where a main clutch of a type other than the fluid type is used, it will be apparent that the clutch may be released either manually or automatically as desired so that the engine A may be idled with the motor vehicle brought to rest, the transmission C being left in one of its gear ratio settings or being manipulated into the neutral setting as may be desired under any particular condition and circumstance of driving.

When it is desired to operate the motor vehicle in reverse, the vehicle driver moves the selector arm 60 into engagement with the reverse notch 65 so as to align the distributor valve outlet 50 with the reverse conduit 54 and, on actuation of the control pedal 117, the fluid pressure from pump 34 will be transmitted through the conduit 54 so as to actuate the reverse brake controlling device 16 and thereby establish the reverse drive of the driven shaft 10.

When the engine A is at rest and it is desired to initially start the engine, the operator depresses the starter button 92 with his foot and thereby connects the shaft 72 with the motor drive shaft 67 by reason of the cooperating clutching elements 76 and 68, the motor E being also thereby energized to cause the starter pinion 84 to drive the flywheel ring gear 85 in a manner well understood in the art. It is thus apparent that a single electric motor E may be made to serve a double function of supplying the necessary power to start the engine and also to operate the various transmission speed ratio controlling devices although, if desired, separate prime movers may be employed for these functions.

Various modifications and changes will be readily apparent from the teachings of my invention, as set forth in the appended claims, and it is not my intention to limit my invention to the particular details of construction and operation shown and described for illustrative purposes.

What I claim is:

1. In an engine driven vehicle power transmission having a speed ratio controlling device, a prime mover, engine starting means adapted for operation by said prime mover, means responsive to operation of said prime mover for actuating said controlling device, and manually operated means for selectively drivingly connecting said prime mover with said engine starting means and with said controlling device actuating means.

2. In an engine driven vehicle power transmission having a plurality of speed ratio controlling devices, a prime mover, engine starting means adapted for operation by said prime mover, manually operable means for selectively controlling operation of said speed ratio controlling devices, means responsive to operation of said prime mover for operating said controlling devices, and manually operated means for controlling operation of said prime mover, said manually operated motor controlling means including a manually actuable control element adapted for effective actuation only when a change in the transmission speed ratio is desired to be effected.

3. In an engine driven vehicle power transmission having a plurality of speed ratio controlling devices, a prime mover, engine starting means adapted for operation by said prime mover, manually operable means for selectively controlling operation of said speed ratio controlling devices, means responsive to operation of said prime mover for operating said controlling devices, and manually operated means for selectively drivingly connecting said prime mover with said engine starting means and with said means for operating said controlling devices.

4. In an engine driven vehicle power transmission having a speed ratio controlling device, an electric motor, engine starting means adapted for operation by said motor, means responsive to operation of said motor for actuating said controlling device, and manually operated means for controlling energization of said motor, said manually operated motor controlling means including a manually actuable control element adapted for effective actuation only when a change in the transmission speed ratio is desired to be effected.

5. In an engine driven vehicle power transmission having a speed ratio controlling device, an electric motor, engine starting means adapted for operation by said motor, means responsive to operation of said motor for actuating said controlling device, and manually operated means for selectively drivingly connecting said motor with said engine starting means and with said controlling device actuating means.

6. In an engine driven vehicle power transmission having a plurality of speed ratio controlling devices, an electric motor, engine starting means adapted for operation by said motor, manually operable means for selectively controlling operation of said speed ratio controlling devices, means responsive to operation of said motor for operating said controlling devices, and manually operated means for controlling operation of said motor, said manually operated motor controlling means including a manually actuable control element adapted for effective actuation only when a change in the transmission speed ratio is desired to be effected.

7. In an engine driven vehicle power transmission having a plurality of speed ratio controlling devices, an electric motor, engine starting means adapted for operation by said motor, manually operable means for selectively controlling operation of said speed ratio controlling devices, means responsive to operation of said motor for operating said controlling devices, and manually operated means for selectively drivingly connecting said motor with said engine starting means and with said means for operating said controlling devices.

8. In an engine driven vehicle having a planetary gear transmission provided with a plurality of speed ratio braking devices, a prime mover, engine starting means adapted for operation by said prime mover, manually operable means for selectively controlling operation of said braking devices, means responsive to operation of said prime mover for operating said braking devices, and manually operated means including a manually actuable control element adapted for effective actuation only when a change in speed ratio is effected for controlling operation of said prime mover.

9. In an engine driven vehicle having a planetary gear transmission provided with a plurality of speed ratio fluid pressure operated braking devices, a prime mover, engine starting means adapted for operation by said prime mover, manually operable means for selectively controlling operation of said braking devices, means responsive to operation of said prime mover for supplying fluid under pressure to operate said braking devices, and manually operated means including a manually actuable control element adapted for effective actuation only when a change in speed ratio is effected for controlling operation of said prime mover.

10. In an engine driven vehicle power transmission having a fluid pressure operated speed ratio controlling device, a prime mover, engine starting means adapted for operation by said prime mover, fluid pressure pumping means, means responsive to operation of said prime mover for driving said pumping means to supply fluid under pressure to actuate said controlling device, and manually operated means for controlling operation of said prime mover, said manually operated prime mover controlling means including a manually actuable control element adapted for effective actuation only when a change in the transmission speed ratio is desired to be effected.

11. In an engine driven vehicle power transmission having a plurality of fluid pressure operated speed ratio controlling devices, a prime mover, engine starting means adapted for operation by said prime mover, a pump adapted to be driven by said prime mover for supplying fluid under pressure to said controlling devices for changing the transmission speed ratio, means for selectively conducting said fluid under pressure from said pump to said controlling devices, and manually operated means including a manually actuable control element adapted for effective actuation only when a change in speed ratio is effected for selectively controlling operation of said prime mover to operate said engine starting means and to drive said pump, said prime mover being inactive except when starting the engine or changing the speed ratio of the transmission.

12. In an engine driven vehicle power transmission having a plurality of fluid pressure operated speed ratio controlling devices, a prime mover, engine starting means adapted for operation by said prime mover, a pump adapted to be driven by said prime mover for supplying fluid under pressure to said controlling devices, means for selectively conducting said fluid under pressure from said pump to said controlling devices, and manually operated means for selectively drivingly connecting said prime mover with said engine starting means and with said pump.

13. In an engine driven vehicle power transmission having a plurality of fluid pressure operated speed ratio controlling devices, a prime mover, engine starting means adapted for operation by said prime mover, a pump adapted to be driven by said prime mover for supplying fluid under pressure to said controlling devices, means including a fluid distributor valve for selectively conducting said fluid under pressure from said pump to said controlling devices, manually operated means for selectively adjusting said distributor valve, and manually operated means including a manually actuable control element adapted for effective actuation only when a change in speed ratio is effected for controlling operation of said prime mover, said prime mover being adapted for operation only when operating said pump to supply fluid to said controlling devices and when operating said engine starting means.

14. In an engine driven vehicle having a transmission, power means for starting the engine, means actuated by said power means for changing the transmission driving ratio, said power means being adapted for operation only when starting said engine or when changing said transmission driving ratio, and manually operated means including a manually actuable control element adapted for effective actuation only when a change in speed ratio is effected for controlling the operation of said power means.

15. In an engine driven vehicle having a transmission provided with a plurality of speed ratio controlling braking devices, an electric motor, a pump adapted to be driven from said motor, a fluid reservoir, means for selectively supplying fluid under pressure from said reservoir and pump to said braking devices, means for returning fluid from said braking devices to said reservoir, and manually operated means including a manually actuable control element adapted for effective actuation only when a change in speed ratio is effected for controlling operation of said motor.

16. In an engine driven vehicle having a transmission provided with a plurality of speed ratio controlling braking devices, an electric motor, a pump adapted to be driven from said motor, a fluid reservoir, means for selectively supplying fluid under pressure from said reservoir and pump to said braking devices, means for returning fluid from said braking devices to said reservoir, manually operated means for controlling operation of said motor, and means for maintaining said fluid pressure at any selected braking device whereby said motor is normally inactive.

17. In an engine driven vehicle having a transmission provided with a plurality of speed ratio controlling braking devices, an electric motor, a pump adapted to be driven from said motor, a fluid reservoir, means for supplying fluid under pressure from said reservoir and pump to said braking devices for changing the transmission speed ratio, manually controlled means for selectively distributing the fluid under pressure to said braking devices, means for returning fluid from one of said braking devices to said reservoir when another of said braking devices is operated by the fluid pressure at the time of changing said speed ratio, and manually operated means including a manually actuable control element adapted for effective actuation only when a change in speed ratio is desired for controlling operation of said motor.

18. In an engine driven vehicle having a transmission provided with a plurality of speed ratio controlling braking devices, an electric motor, a pump adapted to be driven from said motor, a fluid reservoir, means for supplying fluid under pressure from said reservoir and pump to said braking devices for changing the transmission speed ratio, manually controlled means for selectively distributing the fluid under pressure to said braking devices, means for returning fluid from one of said braking devices to said reservoir when another of said braking devices is operated by the fluid pressure at the time of changing said speed ratio, manually operated means for controlling operation of said motor, and means for maintaining said fluid pressure at any selected braking device whereby said motor in its relation to the transmission is adapted for operation only when a change in the transmission speed ratio is desired.

GEORGE L. McCAIN.